Patented Aug. 14, 1945

2,382,601

UNITED STATES PATENT OFFICE 2,382,601

METHOD OF MAKING SINTERED POWDERED IRON ARTICLES

Alfred L. Boegehold and Robert H. Terry, Detroit, Mich., assignors to General Motors Corporation, Detroit, Mich., a corporation of Delaware No Drawing. Application August 14, 1940,
Serial No. 352,522

6 Claims. (Cl. 75—22)

This invention relates to a method of making powdered iron, to the product resulting from the method, and to the formation of sintered articles from the resultant powder.

There are many uses in industry for powdered iron and this invention relates to a method of producing powdered iron from low cost materials that are readily available in quite large quantities, and especially from economical scrap materials.

Powdered iron produced in accordance with the invention may be used for a variety of purposes and is particularly useful in the formation of sintered iron articles. The sintered articles may replace articles formed by conventional methods from cast iron or steel.

In the formation of the sintered articles the iron powder may be compressed or briquetted into substantially the exact shape and size desired and in this way expensive machining operations are dispensed with. The pressure used in the briquetting operation is usually within the range of about 30,000 to 100,000 pounds per square inch. Suitable binders, fluxes, die lubricants or pore forming materials may be mixed with the iron powder and compressed therewith to the desired shape. The briquetted article is then heated to a sintering temperature. Temperatures of around 2000° F. to 2100° F. are suitable. Preferably the sintering operation is carried out under non-oxidizing conditions, as in an atmosphere containing carbon monoxide or other reducing gas or gases.

One important object of the present invention is an economical method of producing powdered iron that is particularly adapted for use in the formation of sintered iron articles, and for other purposes in which powdered iron is used.

Other objects of the invention are: to provide an economical method of producing powdered iron from low cost scrap materials, to provide a convenient and practical method of producing powdered iron from scrap materials that are available in large quantities, to provide a convenient method of producing powdered iron of a high degree of purity, with or without special alloying constituents, and to provide a method of producing powdered iron of a high degree of purity from scrap materials that are readily comminuted or pulverized to the size desired.

Other objects and advantages of the invention will become more apparent as the description proceeds.

In accordance with a preferred embodiment of the invention, mill scale is ground or pulverized in any suitable manner to form finely powdered material. The powdered mill scale which is free of undesirable impurities and which is composed largely of $Fe_3O_4$ along with small amounts of other oxides of iron, is then mixed with powdered material formed by pulverizing or comminuting particles of suitable iron-carbon alloys such as steel or cast iron, especially white cast iron. The mixture of finely powdered mill scale and powdered iron-carbon alloy is then treated under such conditions that the carbon in the iron-carbon alloy powder combines with the oxygen in the mill scale to reduce the mill scale to iron and the iron-carbon alloy is decarburized.

An economical source of the iron-carbon alloy powder is the dust collected from shot blasting operations which is largely formed by the breakdown of the white cast iron shot used. Dust or powder produced in this manner requires no further grinding or comminuting.

The iron-carbon alloy powder may be produced, also, by atomizing iron containing a desired amount of carbon and comminuting the resulting product. The atomizing step may be carried out by flowing a stream of the molten iron-carbon composition into a high velocity jet or jets of water and/or steam and/or air. The brittle and rather small particles produced in this manner may be thereafter ground or comminuted to the size of powder desired.

Where the iron-carbon alloy is to supply all of the carbon required to reduce the mill scale to iron, the amount of carbon in the iron-carbon alloy is determined by analysis and the quantity of the powdered iron-carbon alloy to be mixed with the powdered mill scale is so chosen that a sufficient excess of carbon is present over that required to combine chemically with the oxygen in the powdered mill scale. In this way the mill scale is reduced to iron when heated in a furnace at a temperature high enough to promote the reduction of the oxides of iron without melting, and in a gas atmosphere containing reducing gases in excess of oxidizing gases. Such temperatures may be in the range of about 1400°-2000° F. The resulting iron powder may contain a small amount of carbon.

The ratio of mill scale to the iron-carbon alloy powder is, of course, rather low if the iron-carbon powder is to provide all the carbon required to reduce the mill scale to iron. However, if desired, some of the carbon required may be supplied from the furnace atmosphere and in this way satisfactory iron powder has been produced with a starting mixture composed of equal parts of powdered iron-carbon alloy and powdered mill scale.

The reaction initiated by the intimate contact of the powdered mill scale and of the powdered iron-carbon alloy in the mixture is completed with the aid of the reducing atmosphere surrounding the mixture. The form of carbon available in the iron-carbon alloy powder presumably reacts more readily with the furnace gases than would some form of solid carbon. It is probable that the carbon in the iron-carbon alloy powder first combines with $CO_2$ or $H_2O$ in the furnace atmosphere to form CO or CO and nascent hydrogen, both of which react with oxygen in the iron oxide to reduce the latter to iron. The resultant powder is composed of a mixture of spongy, porous irregular particles from the reduction of the mill scale and solid irregular shaped particles resulting from the decarburization of the iron-carbon alloy particles.

By mixing the constituents required for the reducing reaction, reduction takes place uniformly throughout a thick layer of the powder layer. Consequently the output rate of the furnace used is high. The formation of the nascent reducing gas in close proximity to the place where it is needed is considered an important advantage derived from treating a mixture of powdered mill scale and powdered iron-carbon alloy. The best results are obtained when the mill scale is ground to 250 mesh or finer.

In certain instances it is contemplated that the iron-carbon alloy particles to be mixed with the powdered mill scale may contain a desired and regulated amount of special alloying constituents. For example, manganese, molybdenum, vanadium, nickel, titanium, copper, etc. in small amounts may be useful in special applications. In forming articles of sintered iron powder which are to contain special alloying constituents it is desirable that the alloying elements be already alloyed with the iron. This may be done conveniently in accordance with this invention by forming a molten iron-carbon alloy containing the desired amount of the alloying element or elements and atomizing and comminuting the resulting particles. Certain alloying elements may be added, also, to the iron from which are formed the shot for use in shot blasting operations. The worn out shot will thus contain desired alloying elements.

The mill scale is quite brittle and friable and is easily comminuted or ground to a very fine powder. For this purpose any suitable pulverizer, crusher or ball mill may be used.

The size of powder desired in any particular case will depend on the use to which it is to be put. In the formation of briquetted and sintered parts an iron powder that will pass through a 200 mesh screen has proven satisfactory. Sizes both larger and smaller may also be used. Due to the fact that it is important that the mill scale be ground very fine, it may not be necessary to grind or comminute the iron-carbon alloy to produce powder of the same degree of fineness, as the finely powdered mill scale would make up the percentage of very fine powder needed in the making of sintered iron articles. The spongy particles resulting from the reduction of the mill scale assist in causing coherence of the particles in the briquetting operation.

The following are specific examples for illustrative purposes, of iron-carbon alloy powder compositions that may be used in carrying out the method of this invention.

*Example No. 1*

| | Per cent |
|---|---|
| Carbon | 3.14 |
| Manganese | .41 |
| Silicon | 1.53 |

Balance iron plus minor amounts of ordinary impurities such as phosphorus, sulphur, etc.

The analysis of Example No. 1 is that of white iron shot used in shot blasting operations.

*Example No. 2*

| | Per cent |
|---|---|
| Carbon | 1.20 |
| Manganese | .30 |
| Silicon | .15 |

Balance iron plus minor amounts of ordinary impurities such as phosphorus, sulphur, etc.

The composition of Example No. 2 is one that is especially adapted for making the iron-carbon alloy powder by the atomzing and grinding method described herein.

As illustrative of a reducing gas atmosphere that may be used in carrying out the reducing step in the method, the following may be given:

| | Per cent |
|---|---|
| CO | 10–11 |
| $H_2$ | 13–16 |
| $CO_2$ | 4½– 5 |
| $N_2$ | The balance |

Various changes and modifications in the embodiments of our invention described herein may be made by those skilled in the art without departing from the principles of our invention.

We claim:

1. The method of making an article of sintered ferrous material which comprises, providing powdered mill scale of a size such that it will at least pass through a 250 mesh screen, mixing said powdered mill scale with powdered white iron or steel, heating said powder mixture at a temperature of about 1400° F. to about 2000° F. in a gas atmosphere containing reducing gases in excess of oxidizing gases and for a time sufficient to reduce the powdered mill scale to substantially pure iron without melting the same and to decarburize the white iron or steel powder particles until practically no carbon remains, briquetting the powder mixture produced by reducing the mill scale and decarburizing the white iron or steel, and sintering said briquette at a temperature of about 2000° F. to about 2100° F. in a non-oxidizing atmosphere.

2. The method of making an article of sintered ferrous material which comprises; forming an intimate mixture of finely divided mill scale of a size such that it will at least pass through a 250 mesh screen and powdered white iron or steel; heating said mixture of finely powdered mill scale and powdered white iron or steel in a gas atmosphere containing reducing gases in excess of oxidizing gases until the powdered mill scale is reduced to substantially pure iron powder of a spongy porous character and the white iron or steel powder is practically completely decarburized to provide solid irregular particles of iron, thus providing an intimate mixture of spongy, porous particles of substantially pure iron and solid, irregularly shaped particles of iron practically free of carbon; compressing said powder mixture under high pressure into the shape desired; and heating said compressed powder mixture under non-oxidizing conditions to sinter the same.

3. The method of making a sintered ferrous metal article which comprises; forming powdered mill scale of extremely fine size such that it will at least pass through a 250 mesh screen, intimately mixing said finely powdered mill scale with a powdered white iron or steel; heating said mixture of finely powdered mill scale and powdered white iron or steel in a temperature of 1400° F. to about 2000° F. in a gas atmosphere composed of about 10-11% CO, 13 to 16% $H_2$, 4½ to 5% $CO_2$, and the balance $N_2$ until the powdered mill scale is reduced to substantially pure iron powder of a spongy porous character free of oxygen and the white iron or steel powder is practically completely decarburized to provide solid irregular particles of iron practically free of carbon, thus producing an intimate mixture of spongy, porous particles of substantially pure iron and solid, irregularly shaped particles of iron practically free of carbon; compressing said powder mixture under a pressure of 30,000 to 100,000 pounds per square inch into the shape desired; and sintering said compressed shape in a non-oxidizing atmosphere at a temperature of about 2000° F. to about 2100° F.

4. A method as in claim 3, in which the proportion of finely powdered mill scale in the mixture of powdered mill scale and powdered white iron or steel may be as high as that of the powdered white iron or steel and as low as the amount required to provide the amount of oxygen to combine chemically with all of the carbon of the white cast iron or steel.

5. The method of making an article of sintered ferrous material which comprises, providing powdered mill scale of an extremely small size such that it will at least pass through a 250 mesh screen, intimately mixing said powdered mill scale with powdered steel, heating said powder mixture at a temperature of about 1400° F. to about 2000° F. in a gas atmosphere containing reducing gases in excess of oxidizing gases and for a time sufficient to reduce the powdered mill scale to substantially pure iron of a spongy porous character free of oxygen and to decarburize the steel powder particles, briquetting under high pressure said powder mixture produced by reducing the mill scale and decarburizing the steel, and sintering said briquette at a temperature of about 2000° F. to about 2100° F. in a non-oxidizing atmosphere.

6. A method as in claim 1 in which the quantity of carbon in the white iron or steel powder is an amount at least that sufficient to combine chemically with all of the oxygen in the mill scale.

ALFRED L. BOEGEHOLD.
ROBERT H. TERRY.